(12) United States Patent
Kucinski et al.

(10) Patent No.: US 6,684,052 B2
(45) Date of Patent: *Jan. 27, 2004

(54) SCANNING SYSTEM FOR IMAGING AND STORING THE IMAGES OF TEST ANSWER SHEETS HAVING OPEN-ENDED QUESTIONS

(75) Inventors: Bernard Kucinski, San Antonio, TX (US); Jose Gonzalez, Richardson, TX (US)

(73) Assignee: Harcourt Assessment, Inc., San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/113,035

(22) Filed: Apr. 1, 2002

(65) Prior Publication Data

US 2002/0110798 A1 Aug. 15, 2002

Related U.S. Application Data

(60) Continuation of application No. 09/707,252, filed on Nov. 6, 2000, now Pat. No. 6,366,760, which is a division of application No. 08/903,646, filed on Jul. 31, 1997, now Pat. No. 6,173,154.

(51) Int. Cl.[7] ................................................ G09B 7/00
(52) U.S. Cl. ........................ 434/359; 434/353; 434/358; 434/355; 382/312; 382/321; 382/318; 382/311
(58) Field of Search ................................. 434/359, 353, 434/358, 355; 382/312, 321, 318, 311, 317

(56) References Cited

U.S. PATENT DOCUMENTS

| | | | |
|---|---|---|---|
| 4,205,780 A | 6/1980 | Burns et al. | |
| 4,741,047 A | 4/1988 | Sharpe, II | |
| 4,760,246 A | 7/1988 | Shepard | |
| 4,958,284 A | 9/1990 | Bishop et al. | |
| 4,978,305 A | 12/1990 | Kraft | |
| 5,002,491 A | 3/1991 | Abrahamson et al. | |
| 5,011,413 A | 4/1991 | Ferris et al. | |
| 5,017,763 A | 5/1991 | Shepard | |
| 5,038,392 A | 8/1991 | Morris et al. | |
| 5,054,096 A | 10/1991 | Beizer | |
| 5,101,447 A | 3/1992 | Sokoloff et al. | |
| 5,102,341 A | 4/1992 | Koslin | |
| 5,103,490 A | * 4/1992 | McMillin | |
| 5,134,669 A | * 7/1992 | Keogh et al. | 382/61 X |
| 5,235,433 A | * 8/1993 | Clarkson et al. | 358/434 X |
| 5,258,855 A | 11/1993 | Lech et al. | |
| 5,321,611 A | 6/1994 | Clark et al. | |

(List continued on next page.)

OTHER PUBLICATIONS

Uniscore, Inc., Product brochure, "Score Image" Processing of Constructed–Responses, Essays, and Writing Samples, 1992.

Uniscore, Inc., Product brochure, Image Processing of Open–Ended Questions, 1992.

Primary Examiner—S. Thomas Hughes
Assistant Examiner—Chandra L. Harris
(74) Attorney, Agent, or Firm—Allen, Dyer, Doppelt, Milbrath & Gilchrist, P.A.

(57) ABSTRACT

An imaging system includes two sets of cameras: a first set for capturing optical mark or optical character recognition data and a second set for capturing visual images. Full visual images of pages containing answers to open-ended questions are retained and are retrievable by a reader such that an area of interest wherein the answer is expected is displayed, but the remaining area is also available for viewing. The system permits the alignment of a page based upon edge detection if the page contains only an open-ended answer, obviating the need for timing tracks. Hardware and software elements cooperate to store the image temporarily in a server having a response time commensurate with the scanner. The image is then processed with the use of high-performance index imaging for optical storage and retrieval, and then routed to a long-term storage device.

13 Claims, 10 Drawing Sheets

U.S. PATENT DOCUMENTS

| | | |
|---|---|---|
| 5,433,615 A | 7/1995 | Clark |
| 5,437,554 A | 8/1995 | Clark et al. |
| 5,452,379 A | 9/1995 | Poor |
| 5,458,493 A | 10/1995 | Clark et al. |
| 5,466,159 A | 11/1995 | Clark et al. |
| 5,558,521 A | 9/1996 | Clark et al. |
| 5,597,311 A | 1/1997 | Yanagida et al. |
| 5,672,060 A | 9/1997 | Poor |
| 5,690,497 A | 11/1997 | Clark et al. |
| 5,709,551 A | 1/1998 | Clark et al. |
| 5,716,213 A | 2/1998 | Clark et al. |
| 5,729,741 A * | 3/1998 | Liaguno et al. .......... 707/104.1 |
| 5,775,918 A | 7/1998 | Yanagida et al. |
| 6,115,509 A * | 9/2000 | Yeskel .................... 382/309 X |
| 6,366,760 B1 * | 4/2002 | Kucinski et al. ........ 434/359 X |

* cited by examiner

TEACHER NAME: ___________

GRADE LEVEL:

SCHOOL CODE:

SCANNING SYSTEM FOR IMAGING AND STORING THE IMAGES OF TEST ANSWER SHEETS HAVING OPEN-ENDED QUESTIONS

CROSS-REFERENCE TO RELATED APPLICATIONS

This application is a continuation of and incorporates by reference application Ser. No. 09/707,252, filed Nov. 6, 2000, now U.S. Pat. No. 6,366,760, issued Apr. 2, 2002, which itself is a divisional application of application Ser. No. 08/903,646, filed Jul. 31, 1997, now U.S. Pat. No. 6,173,154, issued Jan. 9, 2001, which are commonly owned with the present invention and which are incorporated herein by reference.

BACKGROUND OF THE INVENTION

1. Field of the Invention

The present invention relates to systems and methods for imaging test answer sheets and, more particularly, to automated systems and methods for processing and storing test answer sheet images that include answers to open-ended questions.

2. Description of Related Art

The automation of test scoring is a complex problem that has generated a great deal of interest, owing to a significant economic pressure to optimize efficiency and accuracy and to minimize human involvement. Optimal mark reading (OMR) systems are well known in the art, such as those for scanning forms having pencil marks within preprinted areas such as ovals. OMR systems generally sense data recorded within the preprinted areas by detecting light absorbed in the near infrared, which is referred to as NIR scanning. This method permits the differentiation of the pencil marks from the preprinted information, which is provided in a pigment that does not absorb in the NIR. OMR systems thus permit a gathering of data that is easily converted into digital form, scored against an answer database, and saved without consuming excessive storage space.

An additional level of complexity is added, however, with the inclusion of open-ended or essay-type questions. These questions must typically be scored by a human reader, and thus either the physical test form or a visible image thereof must be available for at least the time required for scoring. A digitally stored visible image can be obtained by an image processing apparatus, for example.

A multiplicity of systems and methods for addressing the scoring of test answer sheets have been disclosed in the art. For example, Poor (U.S. Pat. No. 5,452,379), Keogh et al. (U.S. Pat. No. 5,134,669), Clark and Clark et al. (U.S. Pat. Nos. 5,321,611; 5,433,615; 5,437,554; 5,458,493; 5,466,159; and 5,558,521) disclose systems and methods for combining OMR and image processing wherein only a predefined area of a document (an "area of interest") is captured and stored.

Another aspect of the problem of processing test answer sheets having both multiple-choice and open-ended questions involves the scanning apparatus used to convert a written document into digital data. The use of combined OMR and image capture devices is disclosed by Poor '379, Keogh et al. '669, Clark et al. '554.

SUMMARY OF THE INVENTION

It is therefore an object of the present invention to provide a system and method for processing and scoring test answer sheets having both multiple-choice and open-ended questions.

It is another object to provide such a system and method that retains a full image of a test form so that it is retrievable by a scorer.

It is an additional object to provide such a system and method that captures OMR and image data in a unitary device.

It is a further object to provide such a system and method that obviates the need for trigger or timing marks on a test form.

It is yet another object to provide such a system and method that distributes answers for scoring to a qualified reader.

It is yet an additional object to provide a flexible system architecture for imaging test answer sheets, storing the images, and distributing the images to a qualified reader for scoring.

It is yet a further object to provide such a system and method that includes a tool for performing a geometric measurement upon a displayed image of an answer sheet.

These and other objects are provided by the imaging and scoring system and method of the present invention. The system includes integrated hardware elements and software processes for capturing optical mark and full visual images of an answer page, for storing the images, for retrieving the images, for distributing the visual images to a reader for scoring, for assisting the reader in scoring, and for monitoring the reader's performance.

The scanning system comprises means for sequentially advancing each page of a plurality of answer pages along a predetermined path. Positioned along the path are mark imaging means (OMR, optical mark recognition; OCR, optical character recognition) for capturing a location of an optical mark on each answer page and visual imaging means for capturing a full visual image of each answer page. A forms database in a server is provided that contains data on the physical location and type (e.g., multiple-choice or open-ended) of each answer on each page. Software means resident in the server operate with the forms database to determine whether the captured image contains an answer to an open-ended question. If such an open-ended answer is supposed to be found on the page being imaged, the full visual image of the page is stored.

In a particular embodiment the scanner further comprises means for aligning the page image without the use of timing or tracking marks. The aligning means comprises means for detecting a page edge, which is sufficient for pages having only open-ended answers.

The present invention further includes a system and method for distributing one of a batch of answer images to a reader for scoring. The answer images typically comprise open-ended answers such as are obtained from the scanning system and method as described above. Preferably each batch of answer images are from a common test, although this is not intended as a limitation.

The method comprises the steps of fetching a batch of answers to a test question from a storage device and placing them in a temporary cache. These fetching and temporary storing steps are preferably under the control of a server. This server contains a database associating each answer batch with a qualification required of a reader. Another database resident therein contains a list of qualifications possessed by each reader.

A reader who is in electronic communication with the cache indicates a readiness for scoring, and that reader's qualifications, which are resident in the server, permit the routing to the reader of one of an available batch of answers based upon predetermined criteria such as priority associated with a test to be scored. An answer image from an appropriate answer batch is electronically delivered to the reader's workstation for scoring. Once the scoring of that answer is complete, the server will distribute additional answer images to that reader until the batch is completely scored or the reader exits the system. Typically, a similarly qualified group of readers score answer images from the same batch.

The present invention additionally includes a system and method for displaying a test answer page to a reader for scoring. In this aspect, the page number for a particular test is used to access a forms layout database, which contains a location of the sector on which the open-ended question is expected to be found. The page image is then formatted to display that answer sector to the reader. Means are also provided for permitting access to the remainder of the page, such as by scrolling on a workstation screen, or to additional pages if the item answer covers multiple pages.

Formatting also comprises providing a scoring protocol for the answer and displaying commensurate indicia to the reader to assist in scoring. For example, a button bar can be displayed on a screen, an item of which can be selected for entering a score.

Another scoring facilitator available to the reader comprises a geometric measurement tool that can be superimposed on an answer and manipulated to provide an indication of how close to an "ideal" answer the student has come.

Scoring is also assisted by an electronic querying system and method, whereby a query is electronically transmitted to successively higher levels of supervisors until an answer can be obtained. The answer is then electronically relayed back through the same levels so that all intermediate personnel can benefit from the knowledge.

In order to monitor the scoring effectiveness of a reader, means are provided for transmitting a calibration answer for scoring. The reader is unaware that this is not another answer in the regular workflow queue. The score granted by the reader can be compared against a target score to judge that reader's effectiveness. In addition, scoring time can be tracked to obtain a measure of scoring speed. Similarly, the calibration answer can be given to a plurality of readers for obtaining effectiveness and speed statistics for a group of readers.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–10.

The Image Capturing and Storage System and Method

Figure 1:
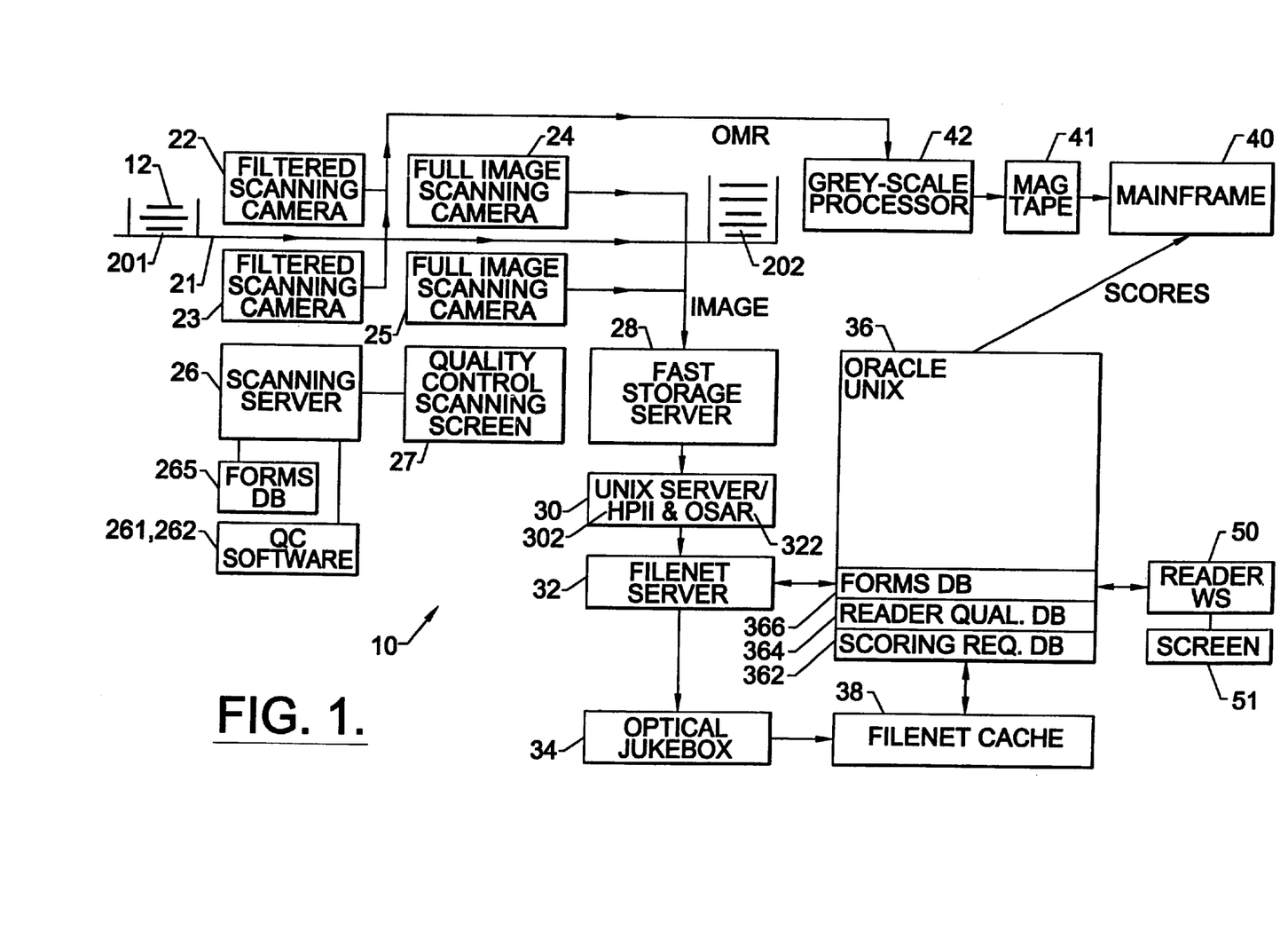
FIG. 1 is a schematic of a hardware configuration of a preferred embodiment of the scoring system.
Figure 2A:
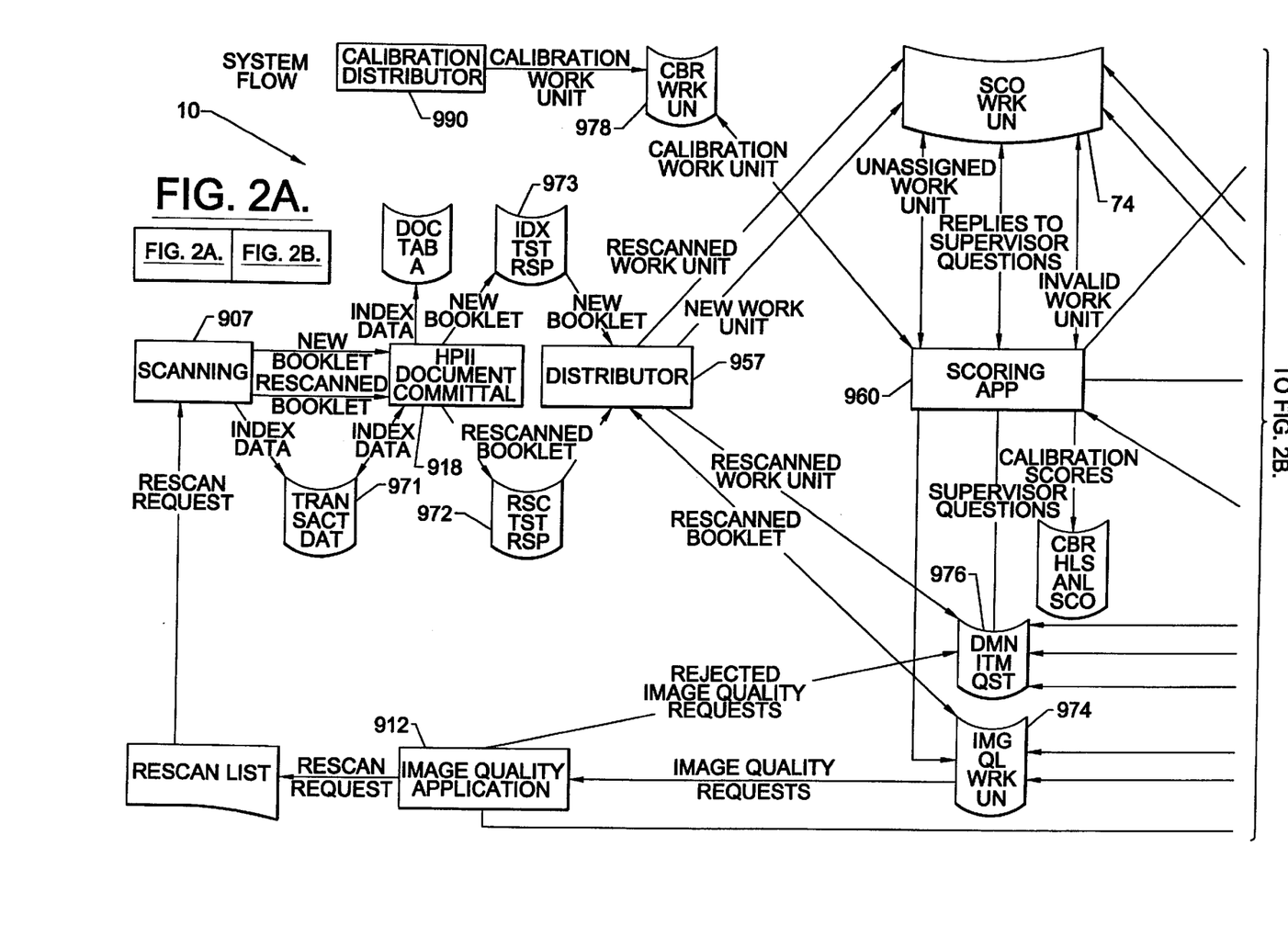
FIGS. 2A and 2B are a schematic of the data processing functions and applications of the soaring system.
Figure 2B:
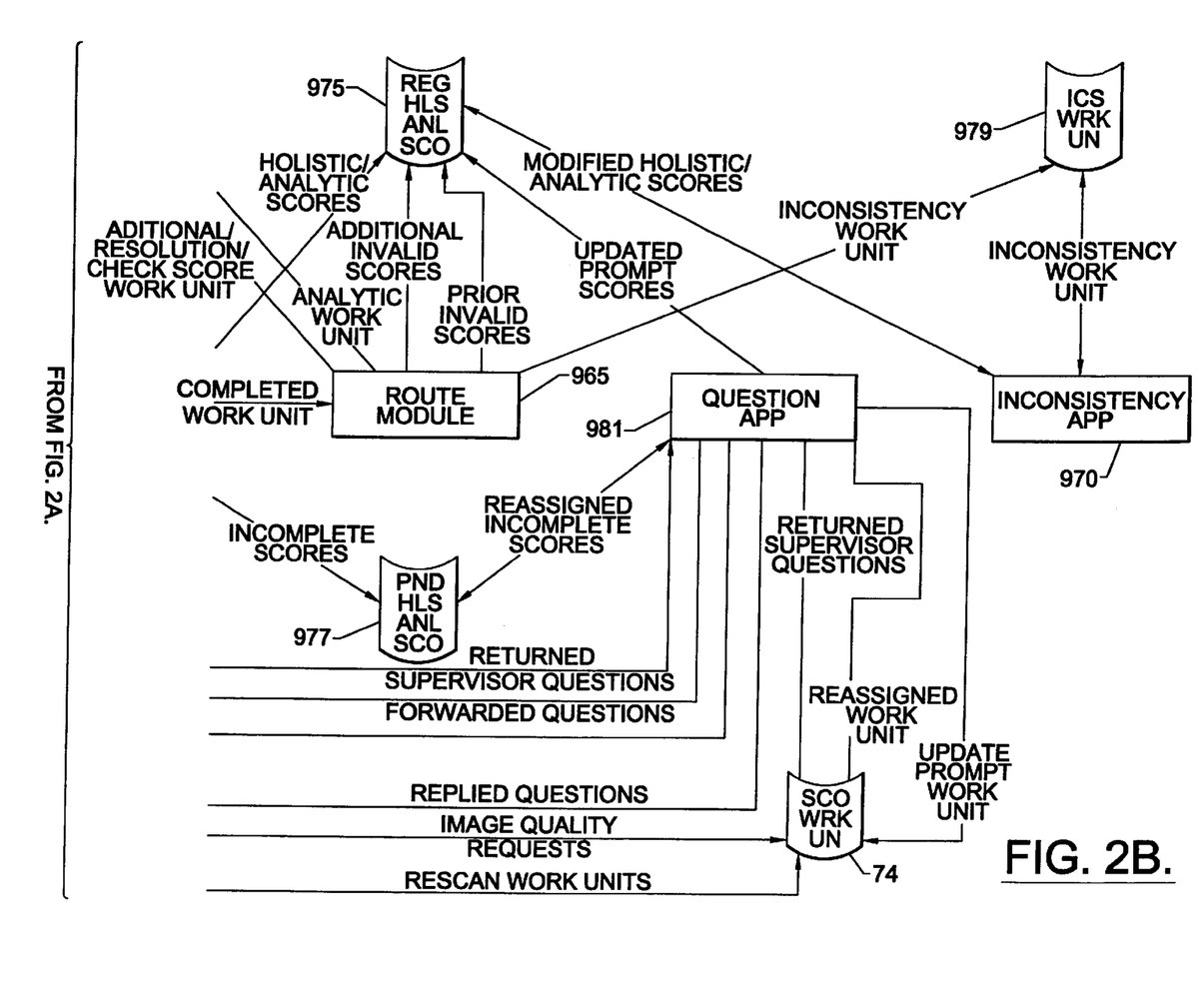
Figure 3:
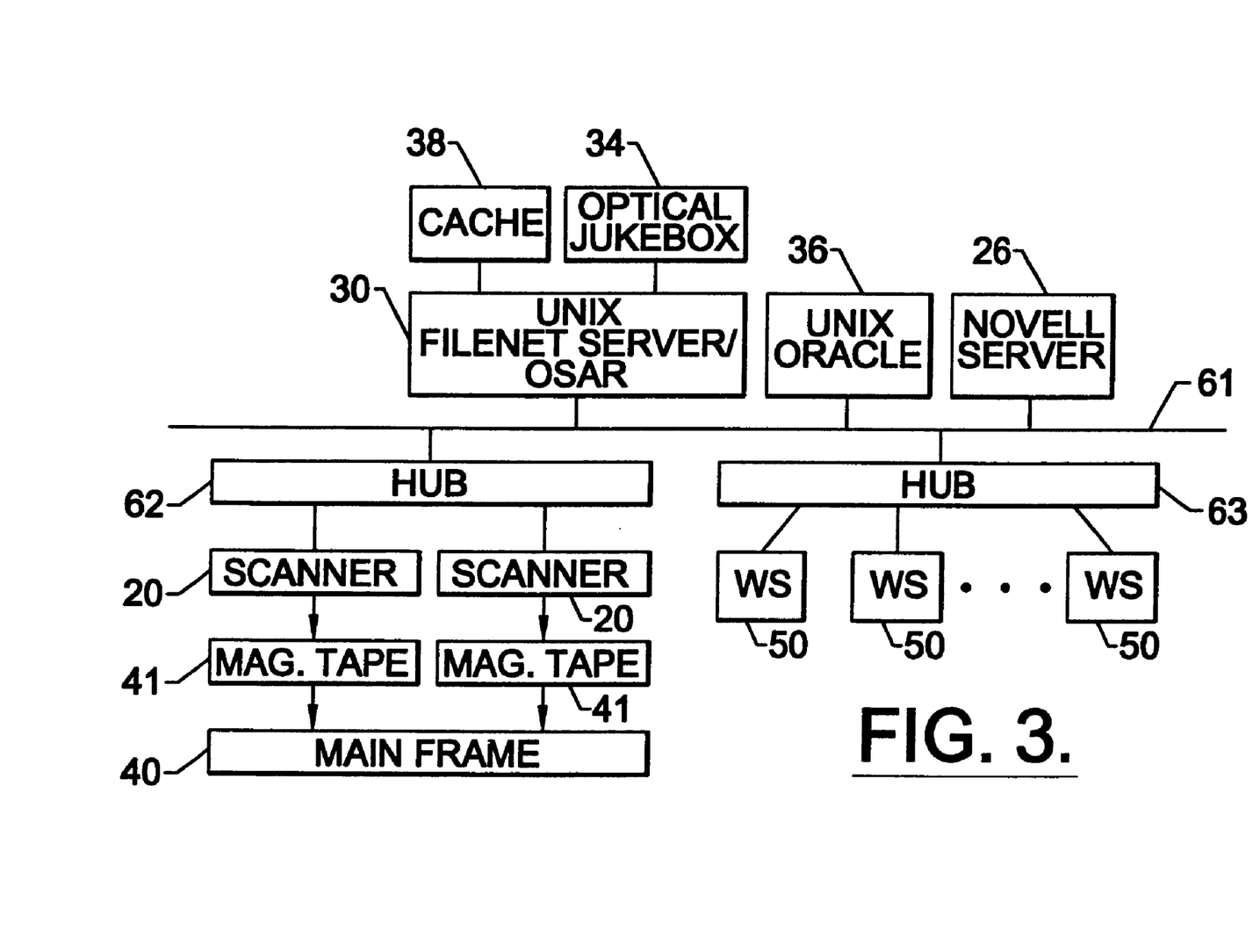
FIG. 3 is a schematic of a network architecture useful in the scoring system.
Figure 7A:
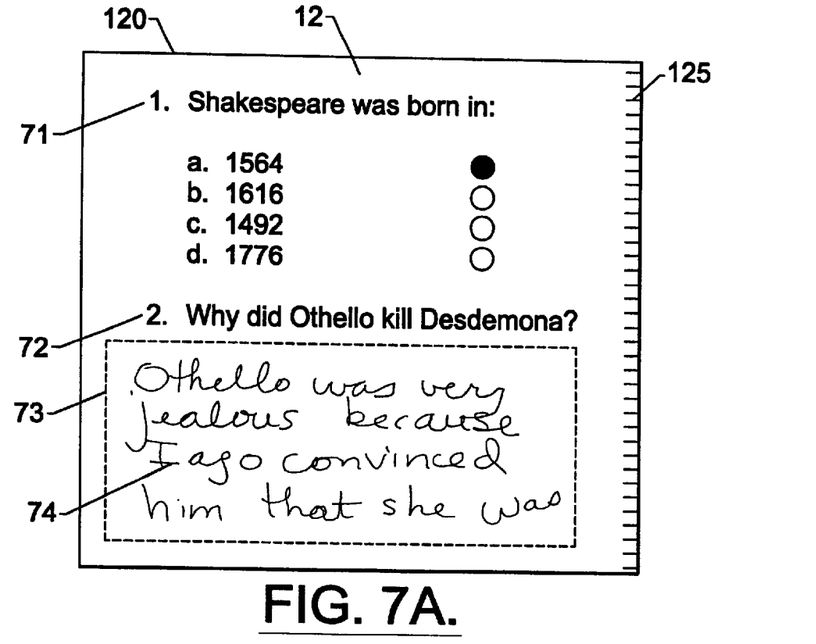
FIG. 7A illustrates an exemplary page of a literature test having one multiple-choice question and one open-ended question.
Figure 8A:
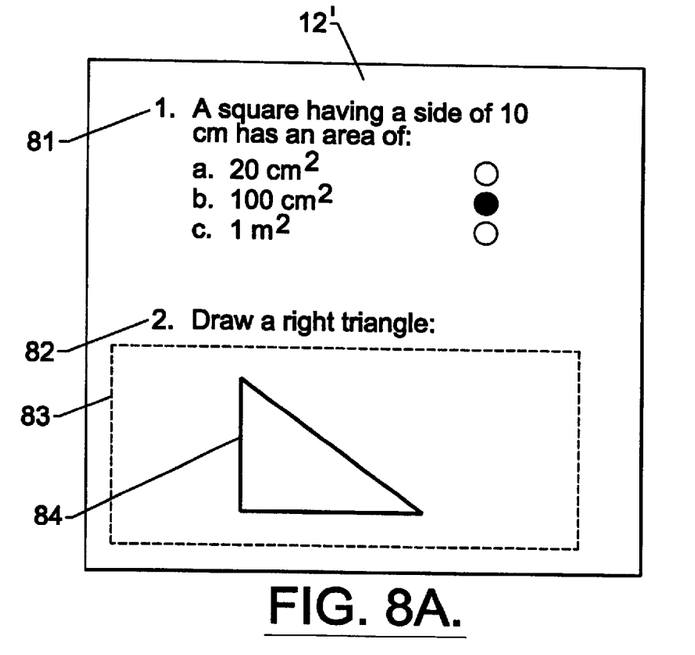
FIG. 8A illustrates an exemplary page of a geometry test having one multiple-choice question and one question requiring the student to draw a diagram.

A schematic of a hardware configuration of a preferred embodiment of the present invention is illustrated in FIG. 1, which includes the imaging and image storing elements, and in FIG. 3, which includes the network architecture. Software application elements are included in the data processing flow diagram of FIG. 2. A flowchart of representative image processing and storing steps is given in FIG. 4, and two exemplary answer pages are illustrated in FIGS. 7A and 8A. The imaging and scoring system 10 hardware elements include a scanner 20 for imaging answer pages. A preferred embodiment of the scanner 20 comprises a modified Scan-Optics 9000 unit, rated for 120 pages/min.

Standardized tests are typically given in batches to students belonging to a particular group, for example, a plurality of sixth-grade students from different schools and different classrooms in a particular geographical region. Each student receives a coded booklet comprising a plurality of pages, and, following test administration, all the test booklets are delivered to a scoring center for processing. A header page 13 (FIG. 10) provides alphanumeric character and OMR-readable data for tracking the booklets. Header page 13 includes, for example, such information as teacher name 131 ("Mrs. Smith"), grade level 133 ("6"), and school code 132 (134274), the latter two having an associated "bubble" filled in for each number. This configuration is exemplary and is not intended as a limitation. One or more of such batches may together form an "order," and a number is also assigned to track this (e.g., all Grade 6 classes in Greenwich, Conn.). Another tracking means comprises "cart number," which indicates a physical location of the booklets. Each test booklet is entered, for example, via bar code, for later demographic correlation with scores, and is cut apart into individual, usually two-sided pages (FIG. 4, step 899).

Figure 4:
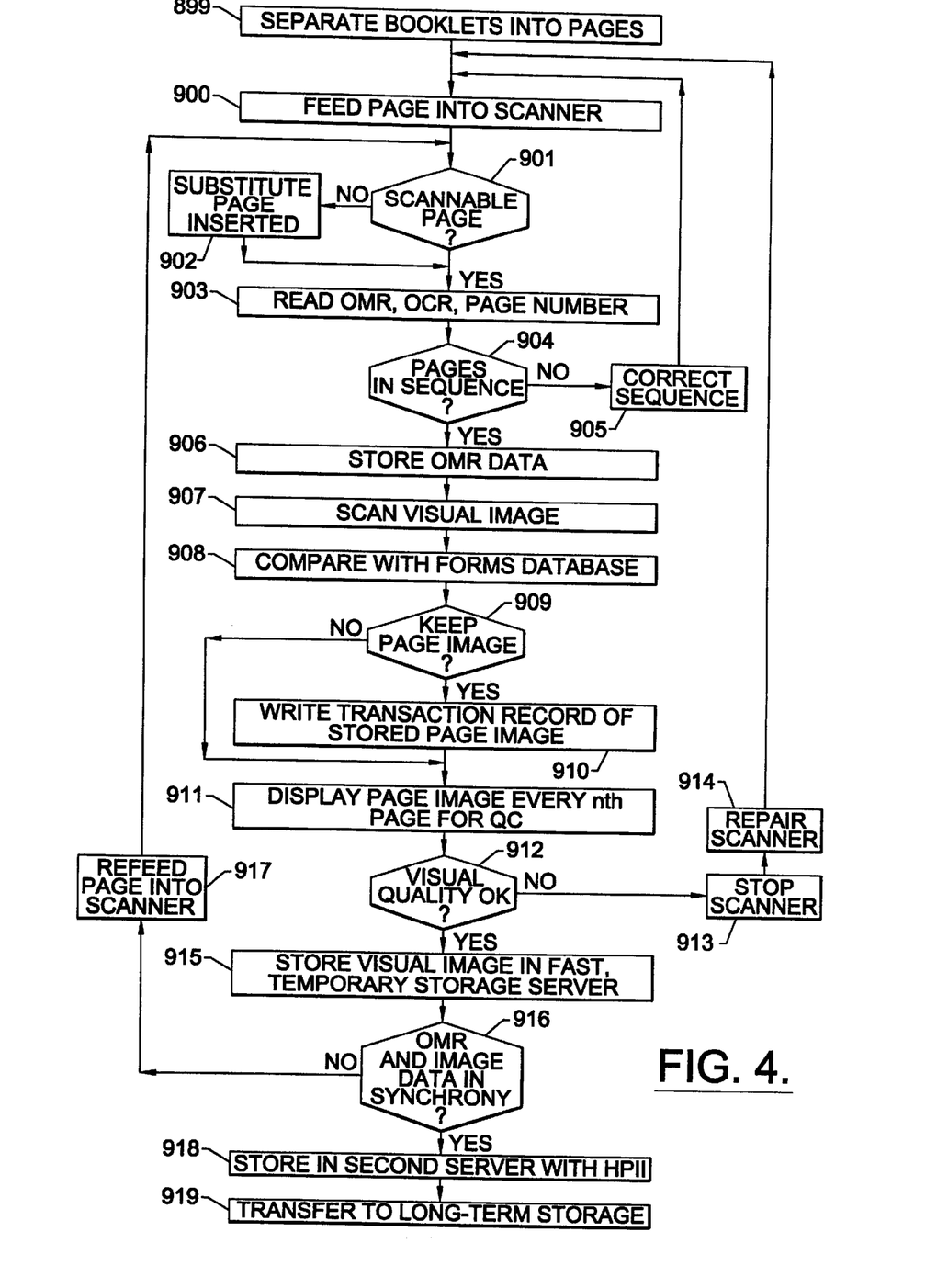
FIG. 4 is a flowchart of representative image processing and storing steps in the method of the present invention.

The test booklet pages are stacked sequentially into an entrance hopper 201 of a scanner 20, and each page 12 is fed by methods well known in the art onto a belt 21 for advancing the page 12 along a predetermined path (FIG. 4, step 900). The belt 21 has a substantially transparent portion for permitting the page 12 to be imaged on both sides simultaneously by two sets of cameras.

A first set of cameras includes an upper 22 and a lower 23 camera, each filtered for infrared wavelengths. This set 22,23 is for optical mark recognition (OMR), used to detect the location of pencil marks, for example, filled-in bubbles such as are common in multiple-choice answers, on both sides of the page 12 (step 903). Alternatively, OCR marks are detected and processed (step 903).

The OMR scan data are greyscale processed by means 42 known in the art for detection of corrections and erasures. The data are then routed to a long-term storage device (step 906), such as magnetic tape 41, for later scoring and further processing in a mainframe computer 40.

A second set of cameras includes an upper 24 and a lower 25 camera, each substantially unfiltered. This set 24,25 is for capturing a full visual image of both sides of the page 12 (step 907).

The page 12 continues along the path on the belt 21 and is collected in sequence with previously scanned pages in an exit hopper 202.

The scanner 20 is under the control of a first server 26, such as a Novell server, which performs a plurality of quality-control functions interspersed with the imaging functions. Software means 261 resident in the first server 26 determine that each page being scanned is in sequence (step 904) from preprinted marks on the page indicating page number. If it is not, the operator must correct the sequence before being allowed to continue scanning (step 905).

The first server 26 also has software means 262 for determining whether the page 12 is scannable (step 901). Pages containing OMR data contain timing tracks 125 as are known in the art (see FIG. 7A) for orienting the page with respect to optical mark position. A page that has these missing is not scannable, and a substitute page marked "unscannable" in placed into the document indicating to the reader that a request for a hard copy must be made before this page can be scored (step 902).

In addition, a screen 27 is in communication with the first server 26 that displays to the operator a preselected number of visual images (step 911). For example, the operator may choose to view every nth page scanned. Should the quality be deemed insufficient (step 912), the scanner 20 is stopped (step 913), maintenance functions or repairs are performed (step 914), and the affected group of pages is rescanned (step 900). This is a custom-designed function, a scanning activity monitor, that automatically searches the output files looking for the latest cart-stack combination and then displays the latest images from the cameras 24,25 for operator review.

The first server 26 further contains a forms database 265 of answer pages that comprises data on the physical location of each answer and a type of answer for each page in the answer booklet. The answer type may be, for example, an answer to an open-ended question or a multiple-choice question. FIG. 7A illustrates a sample page 12 from a literature test, wherein Question #1 71 is multiple-choice and Question #2 72 is open-ended, with an answer space 73 provided for writing an answer 74. Likewise in FIG. 8A, a sample page 12' from a geometry test, Question #1 81 is multiple-choice and Question #2 82 is open-ended, with an answer space 83 provided for drawing a diagram 84. A correlation is performed between the page number and the forms database (step 908) to determine whether the page 12,12' contains an open-ended answer. If so (step 909), the page image is prepared for storage (step 910); if not, the page image is not saved.

The first server 26 also contains means for detecting an edge, preferably an uncut edge 120, of the imaged page. Edge detection is utilized to align the visual image for answer pages containing only open-ended answers. This is beneficial for several reasons: (1) the answer booklets are more economical to produce, since tracks do not need to be printed and printing accuracy is less important; (2) there is less chance of tampering; and (3) the booklets have greater aesthetic appeal.

A page image that is to be saved is stored temporarily in a second server, comprising a fast storage server 28 (step 915) that has a response time sufficiently fast to keep pace with the visual image scanning step 907. Such a second server 28 may comprise, for example, a Novell 4.x, 32-Mb RAM processor with a 3-Gb disk capacity. Means are provided here for ensuring that the OMR and image data are in synchrony (step 916). If they are not, data may have to be reconstructed or images rescanned (step 917).

The data are transferred at predetermined intervals to a third server 30 having software means 302 resident therein for performing a high-performance image indexing (HPII) on the visual image (step 918). This is for processing the data for optical storage and retrieval (OSAR). Third server 30 may comprise, for example, a UNIX 256-Mb RAM processor with a 10-Gb disk capacity having 3.2.1 FileNet and custom OSAR software resident thereon.

The answer images are finally transferred to a long-term storage (step 919) unit 34 for later retrieval. Such a unit 34 may comprise, for example, one or more optical jukeboxes, each comprising one or more optical platters. Preferably two copies are written, each copy to a different platter, for data backup.

Next the transaction log data are transferred to a fourth server 32. Fourth server 32 may comprise, for example, a UNIX 64-Mb RAM processor having Oracle and FileNet software resident thereon.

The Distribution and Queue Monitoring System and Method

Figure 5:
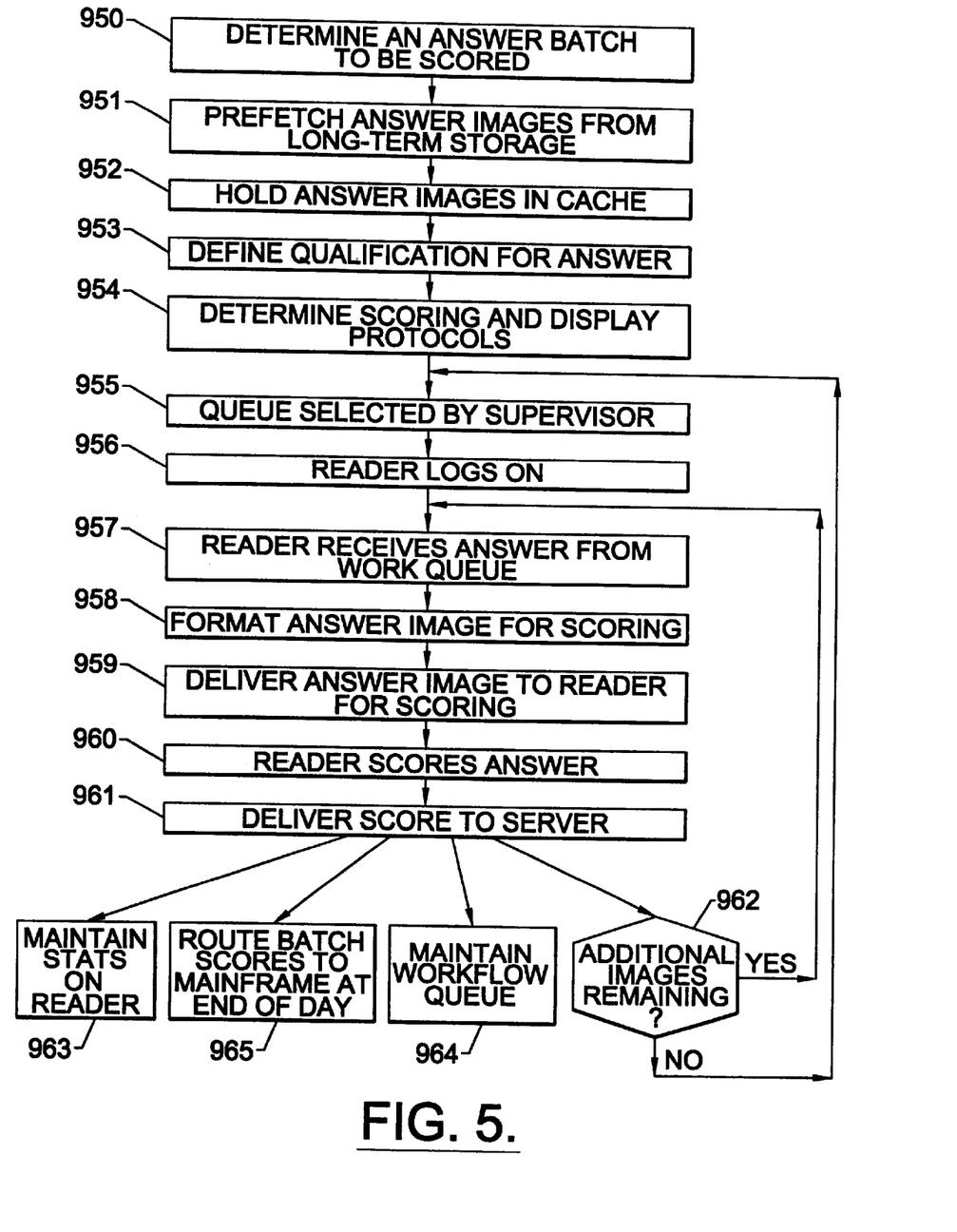
FIG. 5 is a flowchart of a representative process for distributing an answer to a reader for scoring in the method of this invention.

Once a complete batch of answer pages have been imaged and stored, a "batch" comprising, for example, all test booklets from a particular grade level from a particular school, scoring can commence. FIG. 5 is a flowchart of an exemplary distribution process of the present invention, wherein a first step 950 comprises determining an answer batch from a queue to be scored during a particular time period.

In a preferred embodiment, a determination is made prior to the start of a scoring session as to which batches of answers are desired to be scored during that session. This determination may be based, for example, on predetermined criteria including an assigned priority, project number, order number, and number and type of readers available, and is entered into a fifth server 36, which provides a communication link between the fourth server 32, the cache 38, reader workstations 50, and the mainframe 40, as will be discussed in the following (FIG. 1). Fifth server 36 comprises, in an exemplary embodiment, a DEC-Alpha server having 512 Mb RAM and 12-Gb disk capacity, with 3.2c UNIX and 7.2.2.3 Oracle resident therein.

The desired batches are prefetched (step 951) from the long-term storage unit 34 and temporarily stored (step 952) in a cache 38, as directed by the OSAR system 322 in the fourth server 32 under the control of the fifth server 36. These prefetching and temporary storage steps 951,952 confer a speed advantage over having readers access the long-term storage unit 34 directly, which is comparatively slow, whereas the cache 38 response time is rapid. An exemplary cache 38 for use in the system comprises a FileNet residing on the OSAR server and contains 12 GB of magnetic storage for this transient database.

The fifth server 36 contains a first database 362 associating each answer batch with a qualification required of a reader (e.g., sixth-grade math, New York State test). A second database 364 resident therein contains a list of qualifications possessed by each reader. A third database 366 resident therein contains the form data for each answer, including the number of questions and pages in the test, how each answer is to be scored, and in what form the answer image is to be presented to a reader. For example, information on the page in FIG. 7A would include the location of the answer blank 73 to Question #2 and the answer scale to be used in scoring that question (e.g., a score of 1–5).

After the answer batch is lodged in the cache 38, the question qualification 362 and forms 366 databases are referenced (steps 953 and 954), and a work queue is established, which is selected by a supervisor managing a group of readers (step 955).

When a reader logs onto a workstation 50, his or her qualifications will have been checked by the supervisor. The reader receives an answer from the chosen batch for scoring (step 957). The answer image is formatted for display (step 958) and delivered to the reader's workstation 50 (step 959).

Figure 7B:
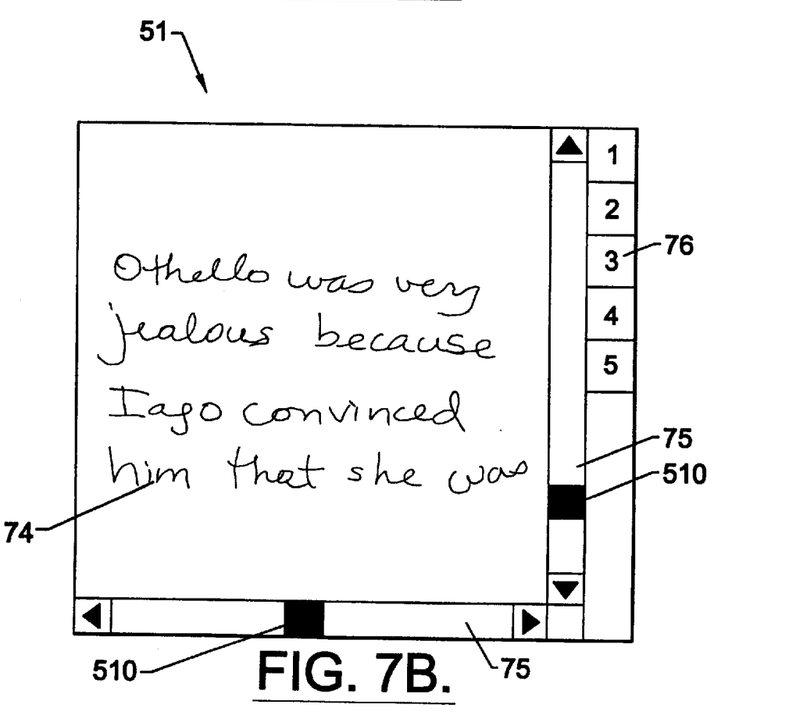
FIG. 7B illustrates a display of the image processed from the page of FIG. 8A as displayed to a reader for scoring.
Figure 8B:
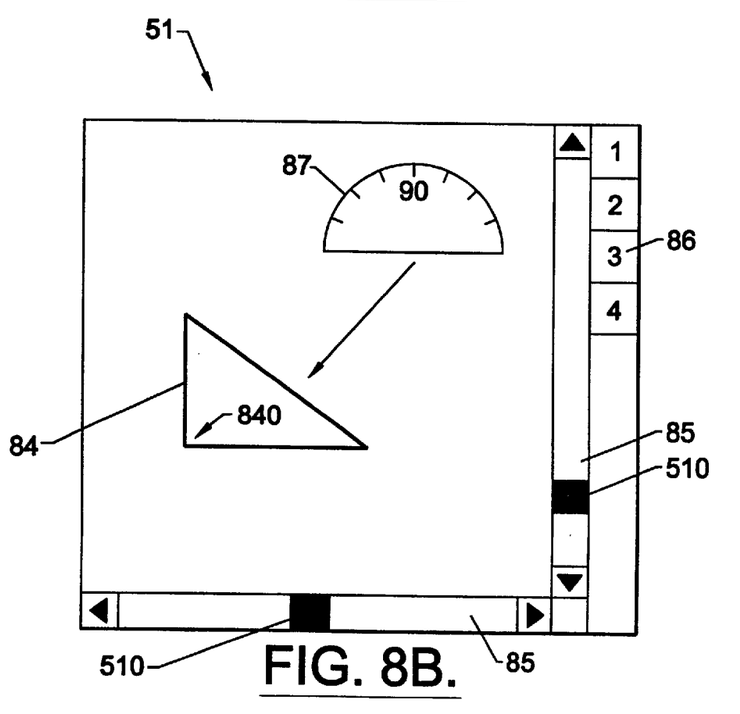
FIG. 8B illustrates a display of the image processed from the page of FIG. 8A as displayed to a reader for scoring.

The formatting step 958 comprises accessing the forms database 366 to determine how the answer image and scoring protocol are to be displayed to the reader. For example, an area of interest 73 (FIG. 7A) or 83 (FIG. 8A), which comprises the space left for writing in an answer, is delineated on each page image, and it is this area that initially appears on the reader's workstation screen 51 (FIGS. 7B and 8B). An important feature of the present invention is that the reader can also access the remainder of the image if desired, which can be necessary if the student has written outside the area provided for that particular question (see FIG. 6, steps 988,989), and may even spill over onto another page. Such access is typically provided by a scroll bar 510 such as are known in the art in Windows®-type applications (FIGS. 7B and 8B). This feature provides an advantage over other systems known in the art in which the visual image is clipped to include only a predetermined area of interest, in which case this extradisplay information is lost.

Once the reader has finished with an answer, a score is entered into the workstation 50 (step 960), which is delivered to and stored at the fifth server 36 (step 962). Next the reader receives another answer to score from the same batch, if there are additional answers of the same test question remaining in the queue (step 962). If that queue is empty, the supervisor selects another answer batch from the queue (step 955). Once the batch is completely scored, the scores are assembled and transmitted by the fifth server 36 to the mainframe 40 (step 965), where all the individual answer scores are correlated for each booklet and a total test score is calculated. This step typically occurs once per day.

The progress and speed of any particular reader or the status of a particular queue are monitored by accessing the fifth server 36, which maintains statistics (step 963) and a table of workflow queues (step 964). Access to this information may be limited, for example, to supervisory or managerial personnel by means known in the art.

The Scoring and Reader Monitoring System and Method

Figure 6:
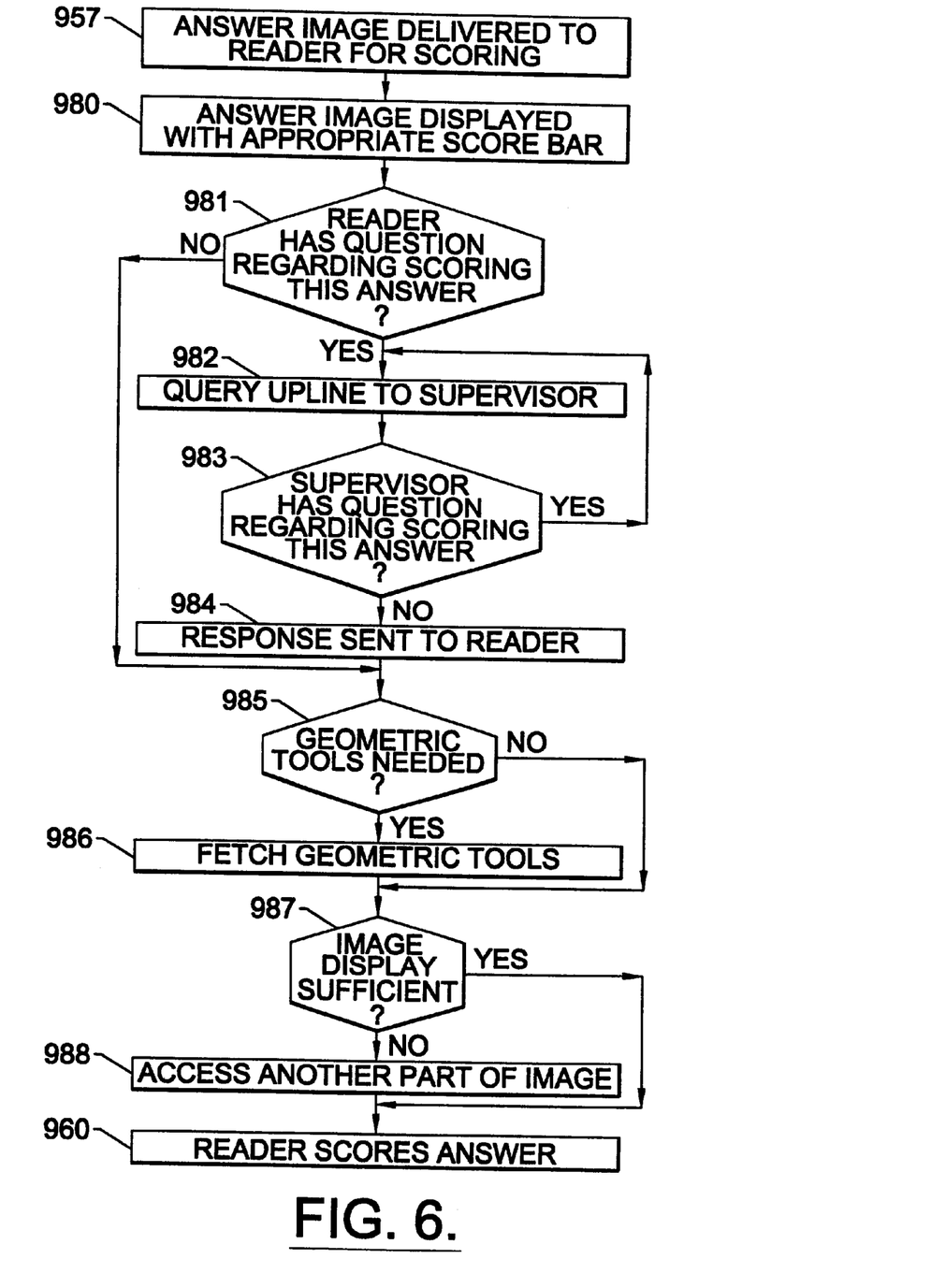
FIG. 6 is a flowchart of representative steps in the scoring process of the present invention following the distribution of an answer to a reader.

One aspect of the scoring system and method of the present invention is illustrated in the flowchart of FIG. 6, which provides further details of the steps occurring between step 957, the delivery of an answer to a reader for scoring, and step 960, the entry of a score, in FIG. 5.

As indicated above, the answer, prior to delivery (step 957), is formatted for electronically selecting an area of interest 73 or 83 for displaying to the reader, along with a scroll bar 75,85 for permitting the reader to access the remainder of the page 12,12' (FIGS. 7A,8A). The answer is also formatted for scoring protocol, and, as illustrated in FIGS. 7B and 8B, a score button bar 76,86 is provided that corresponds to the scoring range for that question. In FIG. 7B, the scores are given on a scale of 1 to 5; in FIG. 8B, 1 to 4. Answers that cannot be give a numeric grade are considered invalid and are scored in a separate category (e.g., blank, foreign language, off-topic).

Scoring facilities such as are known in the art generally comprise groups of readers having similar qualifications who are assigned to types of questions to score. Such groups may be further subdivided into smaller groups, and a commensurate management tree structure created. Preferably this tree structure is mirrored in the hardware architecture (FIG. 3), wherein, for example, a supervisor has access to all reader workstations 50 in that group.

To proceed with scoring, formatted answer and score button bar 76,86 are displayed to the reader (step 980). If the reader has a question regarding the scoring protocol (step 981), a query is sent electronically upline to the reader's next-level supervisor (step 982). If that supervisor can answer the question (step 983), a response is transmitted electronically to the reader (step 984); if that supervisor cannot answer the question (step 983), a query is transmitted upline to the next-level supervisor (step 982), looping through as many levels of supervisors as are present until the query can be addressed. When the query is answered, the answer is relayed to the reader through all intermediate query relayers (step 984) so that all levels of personnel can view the answer to the query. While the query is being routed, the reader can continue scoring another answer.

Once the query is answered, or if there was no query, the reader can continue scoring that answer. If the test is in geometry or some other discipline wherein an answer can comprise the drawing of a diagram, a software tool is made available to the reader to assist in scoring (step 985). If needed, the geometric tool is fetched (step 986) and utilized to score the answer. In the example shown in FIG. 8B, a right triangle was drawn, and thus a floating protractor 87 can be used to measure the right angle 840. Also available are screen-manipulable tools for measuring areas, lines, and circles. This software in the preferred embodiment comprises a custom-designed package.

The reader then determines if the image display is sufficient for scoring the answer (step 987). If so, the reader can score the answer (step 960); if not, the reader can use the scroll bar 510 to access another area of the page, or an area on another page, to view additional parts of the visual image (step 988).

Figure 9:
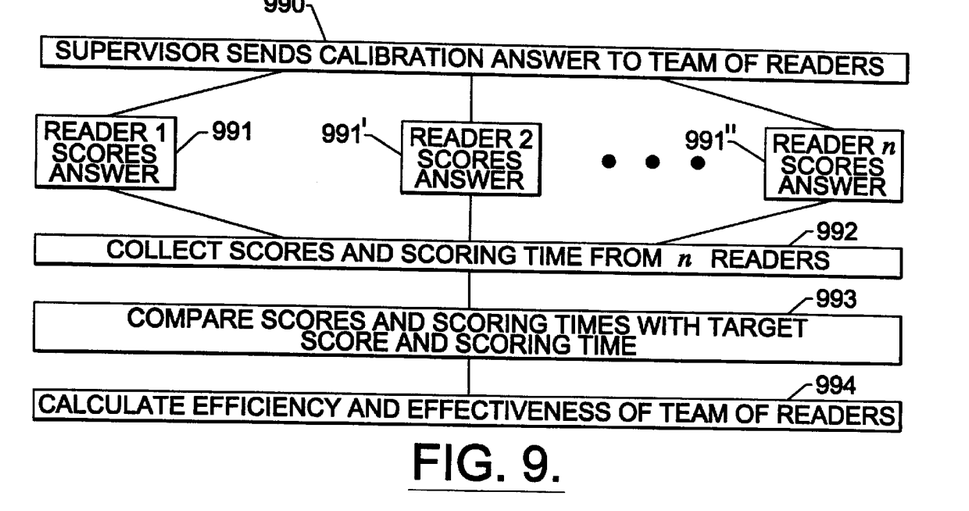
FIG. 9 is a flowchart of representative steps in the reader calibration process of the present invention for tracking scoring efficiency and effectiveness.
Figure 10:
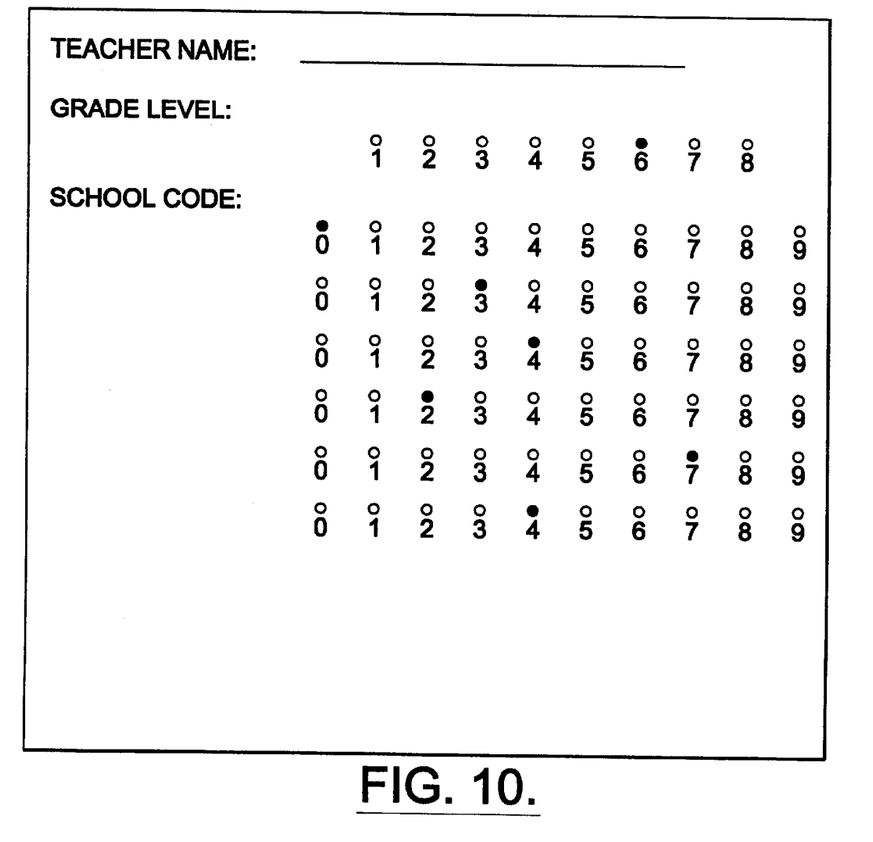
FIG. 10 illustrates an exemplary header sheet for a batch of test booklets.

Another aspect of the present invention includes a system and method for monitoring the scoring effectiveness of a reader, the steps for which are included in the flowchart of FIG. 9. A group supervisor, for example, sends a calibration answer having a predetermined target answer to a reader (step 990). This answer is interspersed with "real" student answers and are substantially identical in form thereto, which permits the calibration to be performed transparently.

A score entered by the reader (step 991) is collected (step 992) and electronically compared with the target score (step 993) for providing an indication of effectiveness (step 994). At the same time, the scoring time can be collected (step 992) and compared with a target scoring time (step 993) for a calculation of scoring efficiency (step 994).

Another check is performed by comparing a score given holistically and analytically by an inconsistency application (970, FIG. 2). If these scores differ too widely, they are rechecked to ensure that an error was not made.

As mentioned, scoring is typically performed by electronically linked groups of readers having similar qualifications. Thus the method illustrated in FIG. 9 can also be expanded to monitor the effectiveness and efficiency of the entire group of readers (steps 991-991") substantially simultaneously if desired.

Statistics can also be amassed at the system level on scoring progress for each workflow queue, broken down into scoring groups or by individual readers. As these statistics are being collected continuously, the system provides enormous flexibility in terms of optimization of effort.

System Architecture and Software System Flow

An exemplary architecture for a preferred embodiment of the present system 10 is schematically illustrated in FIG. 3, and comprises a fiber-optic database distributed interface 61 (FDDI) having a throughput of 100 Mbits. In this embodiment a 100-Mbit fiber is employed to link the subsystems.

Connected to the FDDI 61 are the Novell server 28 and the UNIX servers 30 and 36. The cache 38 and the jukebox 34 are connected through the server 30. A first hub 62 is connected to the FDDI 61 and, via 10-Mbit lines, to the scanners 20, which output to magnetic tape 41, as shown in FIG. 1, and thence to mainframe 40. A second hub 63 is connected to the FDDI 61 and, via 10-Mbit lines, to the reader workstations 50. Second hub 63 acts as a concentrator and has 100 Mbits from FDDI 61. Each workstation 50 has 10 Mbits out on ethernet.

It is believed that this architecture confers advantages over systems previously known in the art, which employ token rings having limited throughput and one server per group. The present system comprises central servers supporting all readers, which permits improved flexibility both in hardware and in software implementation. This architecture further permits the adaptation to remote scoring sites.

The software system flow is illustrated in FIG. 2, wherein each "scoring work unit," (SCO WRK UN), here shown as 74 in FIG. 7A, comprises an answer image. The applications bear like numbers to the steps they perform in the flowcharts. In addition, various caches are maintained between applications, including: transaction data 971 from the scanning operation 907; rescanned 972 and new booklet 973 information from HPII document committal; image quality work units 974 acted upon by the image quality application 912, the distributor application 957, the question application 981, and the scoring application 960; regular holistic and analytical scores 975 from the scoring 960, route 965, and question 981 applications; domain item questions 976, wherein pending questions are held until they are resolved; pending scores 977 for holding incomplete scores; calibration work units 978; and inconsistency work units 979.

New Form Definition

The system of the present invention further comprises a table-driven system for entering new project configurations, including teams, forms, domains, and orders. This allows the scoring to be customized for each project without any recoding.

It may be appreciated by one skilled in the art that additional embodiments may be contemplated, including analogous systems and methods for processing questionnaires.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A scanner for imaging a plurality of answer pages comprising:

mark imaging means for capturing a location of an optical mark on each answer page;

visual imaging means for capturing a full visual image of each page;

means for sequentially moving the plurality of answer pages between the mark imaging means and the visual imaging means;

means for displaying at least a portion of the full visual image to an operator in real time, for performing a check on scanning quality;

means for selecting a frequency of the real-time displaying of images, for permitting the scanning quality check to be performed on every nth page, n selectable by the operator;

means for determining whether any of the pages contains an answer to an open-ended question; and means for storing the full visual image of the page if the page contains an answer to an open-ended question.

2. The scanner recited in claim 1, wherein the mark imaging means comprises an infrared-filtered camera for capturing a pencil mark and the visual imaging means comprises a camera substantially unfiltered for infrared wavelengths.

3. The scanner recited in claim 1, wherein the visual image storing means comprises a temporary storage server having a response time sufficiently fast to keep pace with the visual imaging means.

4. The scanner recited in claim 3, further comprising means for transferring the visual image from the temporary storage server to a processing server having software means resident therein for performing a high-performance image indexing on the visual image.

5. The scanner recited in claim 4, further comprising means for transferring the indexed visual image from the processing server to a long-term optical storage system.

6. The scanner recited in claim 5, wherein the processing server further has software means resident therein for retrieving a desired visual image from the long-term storage system.

7. The scanner recited in claim 1, further comprising;

means for detecting a position of an edge of each answer page; and software means for aligning the answer page visual image based upon the detected edge position.

8. A scanner for imaging a plurality of answer pages comprising:

mark imaging means for capturing a location of an optical mark on each answer page, the mark imaging means comprising a first infrared-filtered camera positioned on a first side of the page and a second infrared-filtered camera positioned on a second side of the page for capturing a pencil mark on both sides of the page;

visual imaging means for capturing a full visual image of the page, the visual imaging means comprising a first unfiltered camera positioned on the first side of the page and a second unfiltered camera positioned on the second side of the page, the first and the second unfiltered camera substantially unfiltered for infrared wavelengths, for scanning a visual image on born sides of the page;

means for sequentially moving the plurality of answer pages between the mark imaging means and the visual imaging means;

means for displaying at least a portion of the full visual image to an operator in real time, for performing a check on scanning quality;

means for selecting a frequency of the real-time displaying of images, for permitting the scanning quality check to be performed on every nth page, n selectable by the operator;

means for determining whether the page contains an answer to an open-ended question; and means for storing the full visual image of the page if the page contains an answer to an open-ended question.

9. The scanner recited in claim 8, wherein the visual image storing means comprises a temporary storage server having a response time sufficiently fast to keep pace with the visual image scanning means.

10. The scanner recited in claim 9, further comprising means for transferring the visual image from the temporary storage server to a processing server having software means resident therein for performing a high-performance image indexing on the visual image.

11. The scanner recited in claim 10, further comprising means for transferring the indexed visual image from the processing sewer to a long-term optical storage system.

12. The scanner recited in claim 11, wherein the processing server further has software means resident therein for retrieving a desired visual image from the long-term storage system.

13. The scanner recited in claim 8, further comprising:
    means for detecting a position of an edge of each page; and
    software means for aligning the answer page visual image based upon the detected edge position.

\* \* \* \* \*